United States Patent
Messer et al.

(10) Patent No.: US 8,055,762 B2
(45) Date of Patent: Nov. 8, 2011

(54) METHOD AND SYSTEM FOR LOCATION IDENTIFICATION

(75) Inventors: Alan Messer, Los Gatos, CA (US); Yu Song, Pleasanton, CA (US); Doreen Cheng, San Jose, CA (US); Swaroop Kalasapur, Sunnyvale, CA (US)

(73) Assignee: Samsung Electronics Co. Ltd, Suwon (KR)

( * ) Notice: Subject to any disclaimer, the term of this patent is extended or adjusted under 35 U.S.C. 154(b) by 306 days.

(21) Appl. No.: 11/787,464

(22) Filed: Apr. 16, 2007

(65) Prior Publication Data

US 2008/0256097 A1 Oct. 16, 2008

(51) Int. Cl.
*G06F 15/173* (2006.01)

(52) U.S. Cl. ......... 709/224; 709/226; 709/229; 709/230

(58) Field of Classification Search .................. 709/220, 709/225, 226, 229, 223–224, 230; 455/456.1, 455/456.6
See application file for complete search history.

(56) References Cited

U.S. PATENT DOCUMENTS

| | | | |
|---|---|---|---|
| 7,139,820 B1 * | 11/2006 | O'Toole et al. ............... | 709/223 |
| 7,213,057 B2 | 5/2007 | Threthewey et al. | |
| 7,221,939 B2 * | 5/2007 | Ylitalo et al. .............. | 455/435.1 |
| 7,263,560 B2 | 8/2007 | Abdelaziz et al. | |
| 7,509,131 B2 * | 3/2009 | Krumm et al. ............. | 455/456.1 |
| 7,610,483 B2 | 10/2009 | Currid et al. | |
| 7,706,811 B2 * | 4/2010 | Shkedi ....................... | 455/456.1 |
| 7,921,218 B2 | 4/2011 | Cheng et al. | |
| 2003/0100307 A1 * | 5/2003 | Wolochow et al. ............ | 455/440 |
| 2004/0203768 A1 * | 10/2004 | Ylitalo et al. ............. | 455/435.1 |
| 2005/0221844 A1 * | 10/2005 | Trethewey et al. ........ | 455/456.6 |
| 2006/0106898 A1 * | 5/2006 | Frondozo et al. ............ | 707/204 |
| 2007/0134641 A1 * | 6/2007 | Lieu .............................. | 434/350 |
| 2008/0043000 A1 | 2/2008 | Currid et al. | |
| 2008/0248809 A1 * | 10/2008 | Gower ....................... | 455/456.1 |
| 2008/0256097 A1 | 10/2008 | Messer et al. | |
| 2008/0313320 A1 | 12/2008 | Cheng et al. | |

OTHER PUBLICATIONS

JSR 179 Expert Group, "Location API for Java 2 Micro Edition, Version 1.0.1," Java Community Process, Feb. 23, 2006, 94 pages.
U.S. Non-final Office Action for U.S. Appl. No. 11/818,860 mailed on Oct. 21, 2009.
U.S. Final Office Action for U.S. Appl. No. 11/818,860 mailed on Mar. 22, 2010.
U.S. Notice of Allowance for U.S. Appl. No. 11/818,860 mailed Dec. 14, 2010.
U.S. Supplemental Notice of Allowability for U.S. Appl. No. 11/818,860 mailed Dec. 23, 2010.

* cited by examiner

*Primary Examiner* — Oanh Duong
(74) *Attorney, Agent, or Firm* — Beyer Law Group LLP

(57) ABSTRACT

A method and system for generating location information for a network space is provided. Generating location information for a network space involves maintaining location profiles for spaces familiar to a client device, and performing location detection for the client device in a current space utilizing a signature of the current space and the location profiles. Location detection for the client device in a current space can also be performed utilizing information indicating the probable presence of familiar resources in the current space.

65 Claims, 5 Drawing Sheets

METHOD AND SYSTEM FOR LOCATION IDENTIFICATION

FIELD OF THE INVENTION

The present invention relates to location identification relating to electronic devices and in particular, to identifying the location of a virtual space relating to computer networks.

BACKGROUND OF THE INVENTION

A space, as referred to herein, contains networked digital devices which host contents and services. The devices, contents and services are collectively called resources. Resources can move within the space and can move in and out of the space. A space can be physical or virtual. A physical space typically correlates with a physical location and may have a post address. A virtual space does not have to correspond to any particular physical location; it may, however, have an associated name and may contain one or more physical locations. Similarly a physical space may contain one or more virtual spaces.

In order to identify the location of a space, a first conventional approach involves using a beacon which periodically broadcasts the name of the space. The name can be used by receiving devices to identify the space. This approach can be used for identifying both physical and virtual spaces. However, using beacon broadcasts requires installing, configuring and maintaining beacons in all spaces of significance. Such infrastructural setup and maintenance is costly and time consuming.

A second conventional approach for space location identification involves using a dedicated location server. The server maintains the location information for at least one space and provides an interface for accessing the location information. A client device can use the interface to access the location information in the server to determine the location of the space. However, this approach also requires costly setup and maintenance.

A third conventional approach for space location identification involves use of a global positioning system (GPS) or the identifications (IDs) of cellular towers. This approach, however, relies on large databases. Further, GPS receivers cannot receive GPS signals when indoors, and many urban areas using the cell tower IDs provide low resolution for determining location. In addition this approach does not identify virtual spaces.

A fourth conventional approach for space location identification involves using signal strength for deducing a current location. This approach uses various signals, e.g., signals from power lines and signals from wireless networks such as WiFi, Bluetooth and cellular networks. However, this approach is also costly as it requires a database containing information that maps the signal strengths to locations.

There is, therefore, a need for a method and system that can identify the location of a space with higher resolution and at a lower cost.

BRIEF SUMMARY OF THE INVENTION

The present invention provides a method and system for generating location information for spaces relating to computer networks. Such information can be used to enhance location-aware applications.

In one embodiment, generating location information for a network space comprises maintaining location profiles for spaces familiar to a client device, and performing location detection for the client device in a current space, utilizing the signature of the current space and said location profiles.

In another embodiment, generating location information for a space comprises maintaining location profiles for spaces familiar to a client device, performing location detection for the client device in a current space, and utilizing information indicating the probable presence of familiar resources in the current space.

Physical sensors may be used, if available, but are not required. The familiar resources may include multiple types for deriving various levels of granularity for locations, to further enhance location-aware applications.

These and other features, aspects and advantages of the present invention will become understood with reference to the following description, appended claims and accompanying figures.

DETAILED DESCRIPTION OF THE INVENTION

Figure 1:
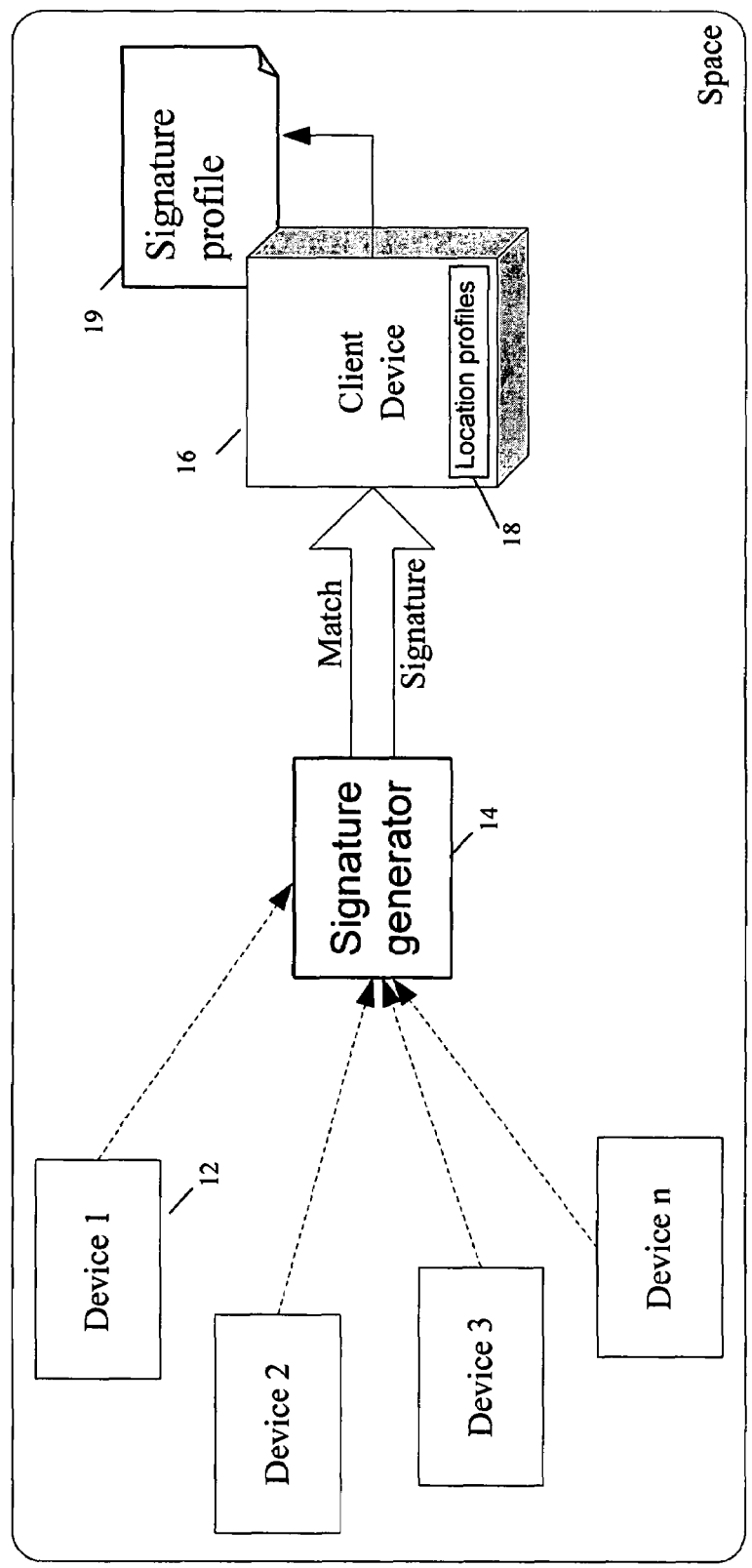
FIG. 1 shows a functional block diagram of an example space including a device for generating location information based on a space signature, according to the present invention

The present invention provides a method and system for generating location information for a space. The location information includes sufficient detail (resolution) to support varying degrees of desired granularity, at a lower cost. In one embodiment, the location information for a space is determined by deriving the location information from a signature already available in the space. The signature may contain information that can be used to derive location information without requiring the use of physical sensors, and at various levels of granularity to further enhance location-aware applications (e.g., recommending content or objects of interest in the space to a user).

To simplify an explanation of the invention, a brief description of terminology is provided first. A client device is a personal electronics device (e.g., a consumer electronics device, computer) which can be mobile or stationary. A space contains networked devices that can host contents and services, wherein the devices, contents and services within a space are collectively called resources in the space. Universally unique identifier (UUID) uniquely identifies a resource in every space.

The examples below take advantage of the observation that a total view of resources present in different spaces are different. The total view portrays types and identifications (e.g., URLs, MAC addresses, IP addresses, UUIDs) of resources, such as devices and services, the operations that can be performed on them and the protocols used for the operations. This total view is captured by forming a signature of the space.

The space signature can be used to distinguish one space from another. For this purpose, the term "familiar space" includes a visited space where the number (or frequency) of visits by a client device (user) has exceeded a threshold. Further, a location profile is formed for each familiar space by associating the location of the familiar space with the signature of the space. The client device can store the location profiles of the familiar spaces. When the client device enters a space, if it can recognize with high enough confidence that the resources of the space are similar to the signature of one of the familiar spaces, the location associated with the signature is likely to be the current location where the client device is.

Example implementations are provided below, wherein the first two examples differ in the amount of location detection computation performed by a mobile client device versus the computation performed by the space (i.e., by one or more devices in the network space).

In the first example implementation, the space computes and maintains its own signature and generates its own location profile by associating its location with its signature. The client device caches (i.e., keeps in a local memory device) the profiles for familiar spaces and uses them to identify a current location as the device moves.

Specifically, the first example implementation involves utilizing the signature of a space for location detection computation, wherein the signature is first computed by one or more devices in the space using the resources in the space. The signature is then associated with the location of the space to form the location profile of the space. The client device caches the location profiles of familiar spaces. Later when the client device enters a space, it selects a location profile from the cached profiles, attempts to reach the reachable resources in the space, computes a signature using the reachable resources and compares the result of the computation with the signature in the selected location profile. The result of the comparison provides a confidence level about whether the location associated with the selected signature is the current location. If the confidence level is low, the client device selects another location profile from its cached profiles and repeats the process until either the confidence level is high and the location is satisfactorily determined, or none are satisfactory. The latter case can be interpreted as that the device is not in any of the familiar spaces.

An example of constructing a signature for a space using reachable resources in the space, involves providing one or more resources in the space, providing an identifier (UUID) for every resource discovering resources in the space, and generating a signature for the space using the identifications of the set of discovered devices. As resources can move in and out of a space, signature construction further involves: verifying that the resources included in the signature are still in the space, updating the set of currently reachable resources based on the verification and generating a new signature for the space using the identification of the resources in the updated set.

A signature can be generated in various ways depending on the planned use of the signature. For example, if the signature is used to identify spaces with relatively stable and distinct characteristics, e.g., home and work, a hash value of the identification of reachable resources may suffice. If on the other hand, the signature is used to identify spaces that are frequently changing or with shared reachable resources (e.g., office versus lab), a list of original resource identifications is more appropriate. In addition, the type of resources included in the signature may vary with the purpose of the signature. For example, resources reachable with longer range networks, e.g., WiFi, can be used for distinguishing larger size adjacent spaces, whereas resources reachable with shorter range networks, e.g., Bluetooth, can be used to further distinguish smaller spaces. The signature of a space can also contain the location information of the space which can be the information about the virtual location, or physical location, or both.

A process for utilizing the signature of a space for location detection, involves a client device maintaining location profiles for familiar spaces, wherein the client device derives current location information by: selecting a location profile from the profiles, attempting to reach the resources captured in the signature of the selected location profile, computing a new signature using the currently reachable resources, computing the similarity between the new signature and the signature of the selected location profile, such that when the similarity exceeds a defined threshold the location information associated with the selected signature is used as the current location of the client device. As such, periodically: (1) the client device attempts to fetch the space signature from the current space and compares the signature with the ones stored in the location profiles, and (2) if there is a match, the client device selects the location in the matched profile as the current location, and stops (or repeats, for periodic location sensing).

FIG. 1 shows a functional block diagram of an example network space 10 including a device for generating location information based on the space signature, according to the said first example implementation. The space 10 includes resources such as one or more devices 12 wherein a signature generator 14 uses identifications of the resources in the space 10 to determine a signature for the space 10. The signature generator 14 also associates the signature with the location of the space to generate the location profile for the space.

A client device 16 caches location profiles 18 for familiar spaces and derives current location information by comparing the signature of the current space with the stored location profiles 18. The client device 16 attempts to select a location profile from the cached profiles, and attempts to reach the reachable resources in the space. The client device 16 also computes a signature using the reachable resources, and compares the result of the computation with the signature in the selected location profile. The result of the comparison shows the confidence level as to whether the location associated with the selected signature is the current location. If the confidence is low, the client device selects another location profile from its cached profiles and repeats the process until either the location is satisfactorily determined or none are satisfactory. The latter case can be interpreted as that the device is not in any of the familiar spaces.

In the second example implementation, the client device computes space signatures as it moves from space to space, and forms location profiles for familiar spaces, storing signatures of familiar spaces for use in location identification. A process for location detection does not assume, nor require, that the space provide a signature. Instead, as the client device moves from space to space, the client device computes the signature of each space where the device resides, recognizes familiar spaces, and forms location profiles for the familiar spaces. The location determination process includes the steps of: (1) storing location profiles for familiar spaces, (2) checking for the presence of the full or subset of familiar resources (e.g., devices and services) using familiar operations and protocols that are described in the location profiles, and (3) determining the current location using the results of checking.

In addition to the location information for a space, the location profile of the space may include information about one or more of: (1) familiar devices/resources in the space, (2) familiar services available in the space, (3) special operations that can be performed within the space and (4) specific communication mechanisms/protocols required to operate within the space. The special operations and protocols in location profile files can then be used to check how many familiar devices/services can be reached and to check how many special actions can be performed in the space.

An example of similarity computation in determining the current location involves counting the number of successful checks. For example, the higher the number of familiar resources that can be reached in the current space, the more likely that the location information in the location profile describing the familiar resources is the current location of the client device. As such, from among the location profiles of the familiar spaces, a location profile describing familiar resources that are most numerous in terms of their presence in the current space is selected for location information for the current space.

Examples of such checking include: (1) checking for the presence of familiar devices using well known mechanisms such as pinging the name/ID of one or more familiar devices, (2) checking for the presence of familiar services using well known mechanisms such as "wget webpage_from_intranet" and (3) checking for familiar operations using protocols such as Universal Plug and Play (UPnP)_(e.g., the client device can have particular permissions set to access resources such TV, automotive electronics).

In one case, the location profiles can be checked one after another. As soon as the number of successful checks using a location profile exceeds a threshold, the location information of the profile is chosen as the current location. In another case, all location profiles are checked and the one with the highest successful check is chosen. In yet another case, all location profiles are checked and a threshold is set. Only the profile with the highest successful checks above the threshold will be chosen. In this case, no location information can be derived if all checks are below the threshold. Other ways of checking the location profiles within the scope of the present invention are possible, as those skilled in the art will recognize.

A space signature captures the characteristics of a space. In the context of the present invention, a space signature captures the resources in the space and it is used for identifying the space. Therefore, familiar resources are the devices in a familiar space. Similarly, familiar resources are the resources in a familiar space.

For location identification purposes, a space signature is associated with the location information about the space so that if a client device recognizes the space signature, the client device also obtains the name or address of the space.

A location profile is a client side concept; it is used by the client for identifying the location of a space. Structurally a location profile also contains a space signature and its associated location information. The location information can be personalized.

Space signatures can also be computed and kept by spaces themselves. In that case the client may still use a personalized location profile for a user's favorite labeling. The concept of a location profile may be totally different and different spaces may choose different definitions. For example, a space may choose to only keep the physical address, while another space may choose to keep all the labels generated by all the client device visitors.

Figure 2:
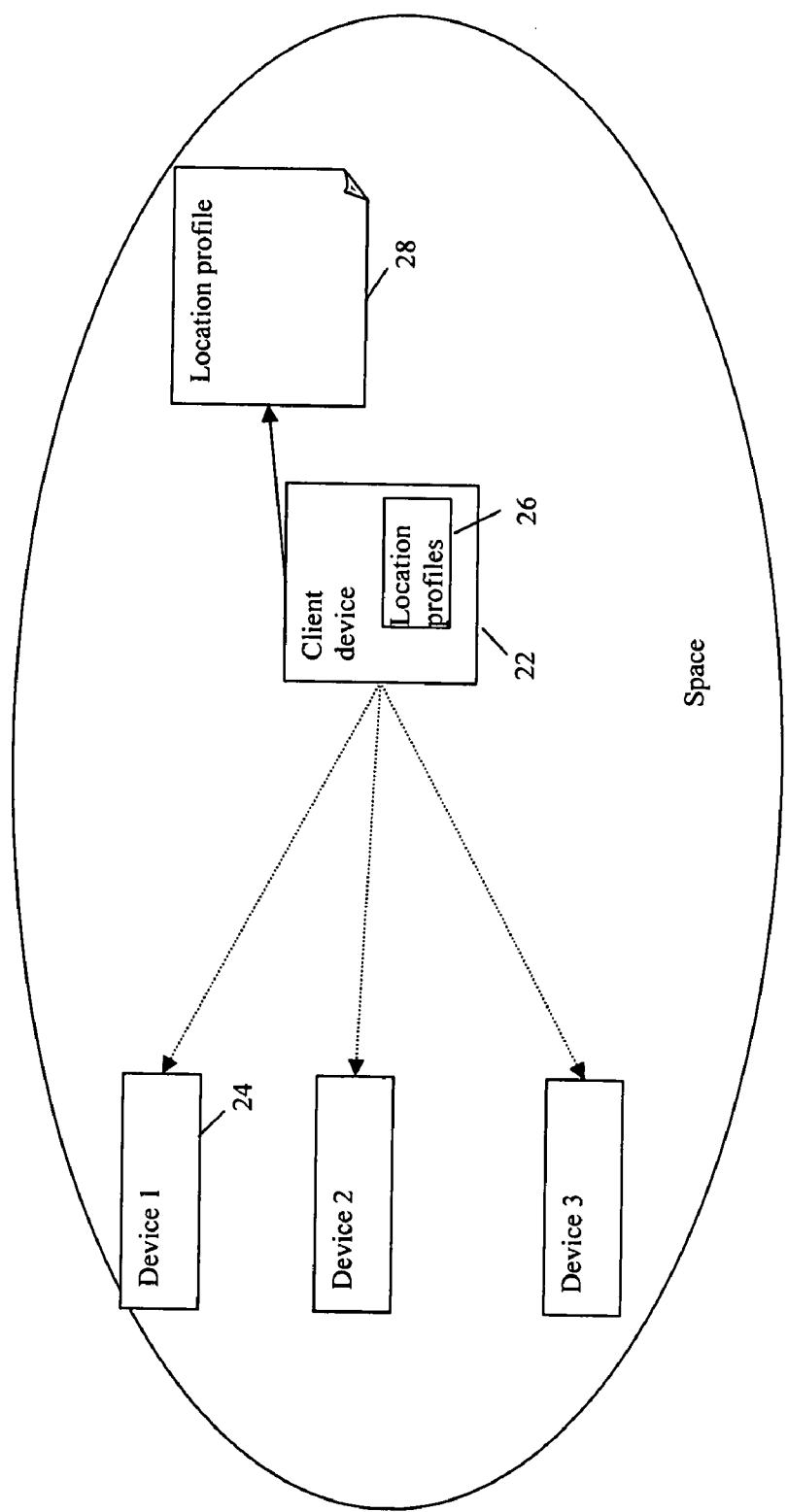
FIG. 2 shows a functional block diagram of another example network space generating location information including a client device and resources, according to the present invention.

FIG. 2 shows a functional block diagram of another example network space 20 including a client device 22 and resources such as devices 24, according to said second example implementation. The client device 22 generates location information without assuming, or requiring, that the space 20 have a signature. Instead the client device 22 computes signatures of a space where it is, recognizes familiar spaces and forms location profiles for the familiar spaces. A location profile for the space 20 includes location information and information about familiar devices in the space, familiar services available in the space, special operations that can be performed within the space, and/or specific communication protocols required to operate within the space.

In this example, the client device 22 maintains location profiles 26 for familiar spaces. Upon entering the space 20, the client device 22 checks for the presence of the full or subset of familiar devices and familiar services using familiar operations and protocols that are described in the location profiles 26 stored in the client device 22. The client device 22 selects the current location profile 28 from the location profiles 26 based on the presence or absence of the checked devices.

The information about the familiar devices can be supplied a priori by the user or can be generated by observing the activity of the user. When the client device needs the location information in the space 20, it starts by performing checks on a number of the devices 24, in a similar fashion as described above. Successful responses for these checks from the devices 24 will ensure that the location information is the same as that corresponding to the particular profile.

Figure 3:
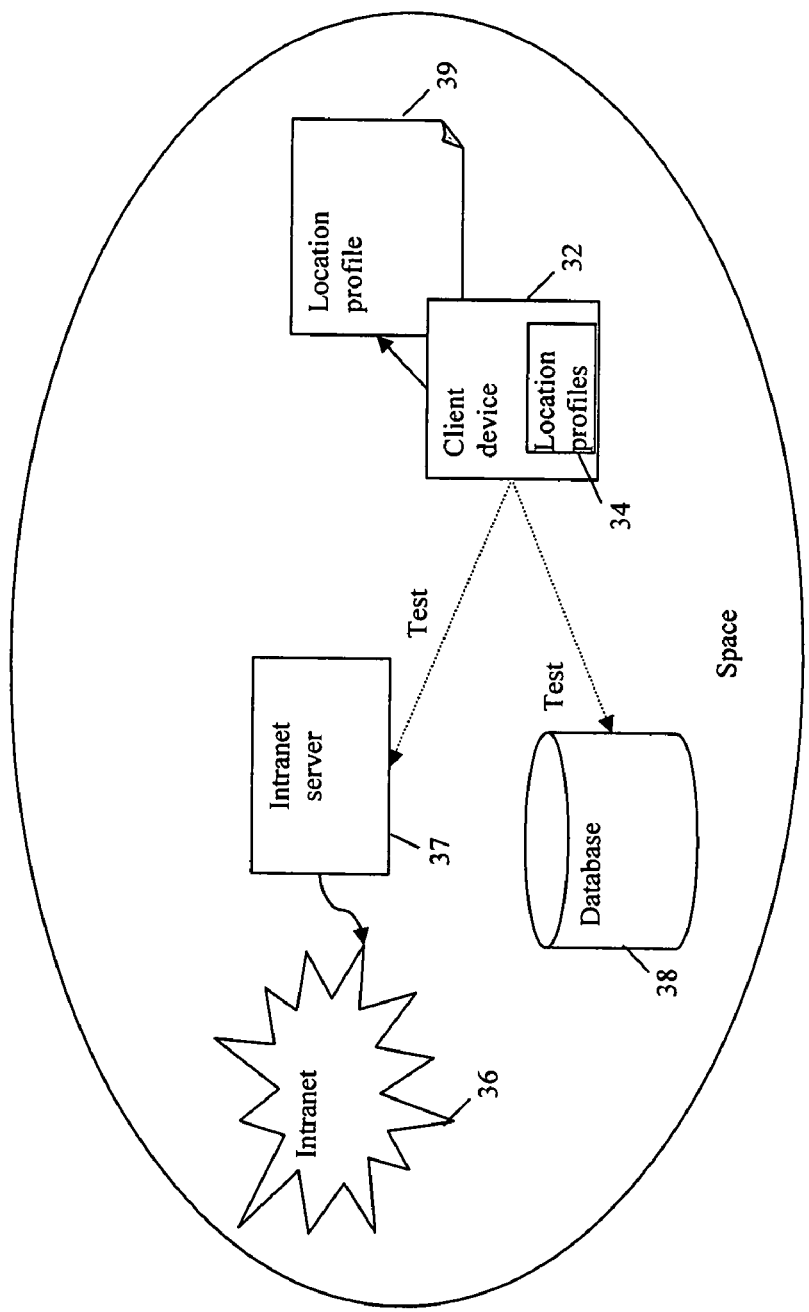
FIG. 3 shows a functional block diagram of another example network space generating location information including a client device, an intranet, an intranet server and a database, according to the present invention.

FIG. 3 shows a functional block diagram of a third example network space 30 including a client device 32, an intranet 36, an intranet server 37 and a database 38, according to the present invention. The client device 32 generates location information by checking the resources in the space, without assuming, or requiring, that the space 30 has a signature. The client device 32 includes location profiles 34 containing details of the services that are available at a particular location. Examples of such services include intranet in a workplace, a particular server at the workplace, etc.

The client device 32 performs checks by testing operations with the resources 36-38 in the space 30. The client device 32 performs simple operations such as obtaining a webpage from the intranet 36 through "wget intranet_homepage" via the server 37, accessing the database 38, etc. The result of each operation contains a status indicating whether the operation is successful. The more tests that are successful, the higher the confidence is about the location of the device 32. The client device 32 selects the current location profile 39 from the location profiles 34 based on that confidence in a similar fashion as described above.

The location profiles can be formed in various ways. For example, the location profiles can be specified manually or learned by a device over time. To account for learning about familiar spaces, a term "visited space" is defined as a space the user (client device) has visited but the frequency of visits is below a threshold. If the current space signature, or results of checking the presence of devices, does not match any of the stored profiles, or the client device does not have any stored profiles, the client device compares the current signature/checking-results with the signatures/checking-results stored in the visited spaces. If none of the visited spaces matches the current signature/checking-results or there are no visited spaces, the device stores the signature/checking-results at a visited space, sets the visited count to one, and stops (or repeats, for periodic location sensing). If there is a match, the device increases the visited count by one. If the count exceeds a threshold, the signature/checking-results are moved from the visited spaces to the familiar spaces and the locations associated with the signature/checking-results are used as the current location, and stops (or repeats, for periodic location sensing).

For storage-limited devices, a limit can be set for the number of the familiar spaces; another limit can be set for the number of the visited spaces. As those skilled in the art will recognize, various embodiments of the present invention can be implemented for different devices, taking into account different factors. Both example implementations can further include the step of attempting to gather location information by querying peers in the network, if location cannot be determined with sufficient confidence.

The client device 22 generates location information without assuming, or requiring, that the space 20 has a signature.

The client device 32 generates location information by checking the resources in the space, without assuming, or requiring, that the space 30 has a signature.

Figure 4:
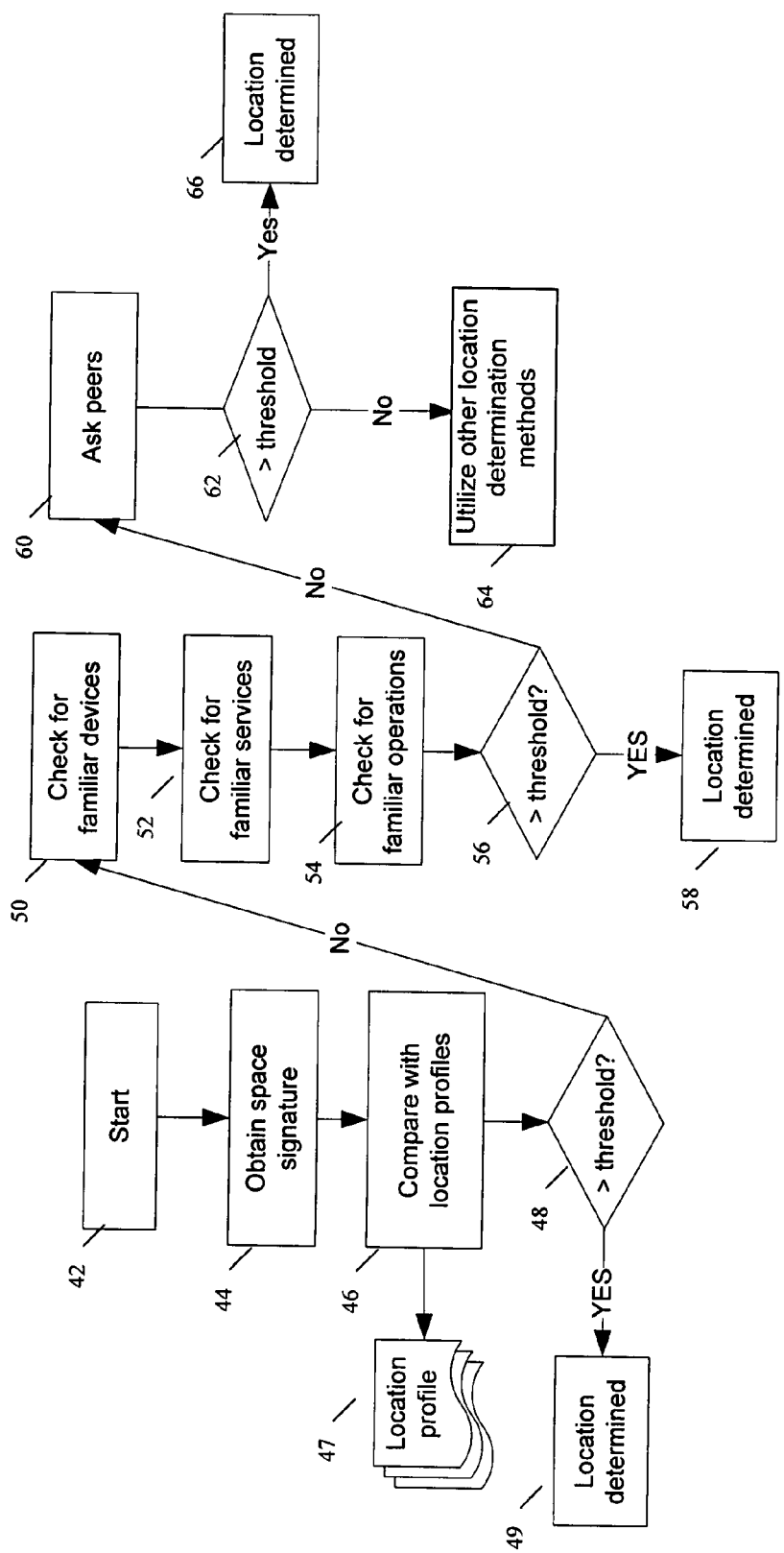
FIG. 4 shows a flowchart of an example process for space location determination, according to the present invention.

The above example implementations can be used independently (e.g., one before the other) or together. FIG. 4 shows one of many ways to use them together in an example process 40, including the following steps for a client device in a space:

Step 42: Start.

Step 44: Obtain the space signature.

Step 46: Compare with location profiles, 47 in the client device.

Step 48: Is it greater than a threshold? If yes, then go to step 49 where location is determined, otherwise go to 50.

Step 50: Check for familiar devices in the space.

Step 52: Check for familiar services in the space.

Step 54: Check for familiar operations in the space.

Step 56: Is it greater than a threshold? If yes, then go to step 58 where location is determined, otherwise go to step 60.

Step 60: Send messages to other mobile devices (peers), if any, in the space to determine whether any of them know the location of the current space.

Step 62: Where more than one location is identified by the peers, determine if the number of times a location is identified by the peers is greater than a threshold? If yes, then go to step 66, otherwise go to step 64.

Step 64: Use other location determination methods, such as a conventional location determination method. Stop.

Step 66: When more than one location is identified by the peers, the client device can choose the one returned by the highest number of peers. Location of the space is determined (identified). Stop.

Many variations exist just by changing the order of the checking of familiar devices, services and operations. Several variations can also result from changing the order of process and asking peers. Further, though some of the above examples involve a mobile client device, the present invention is applicable to stationary client devices as well.

Figure 5:
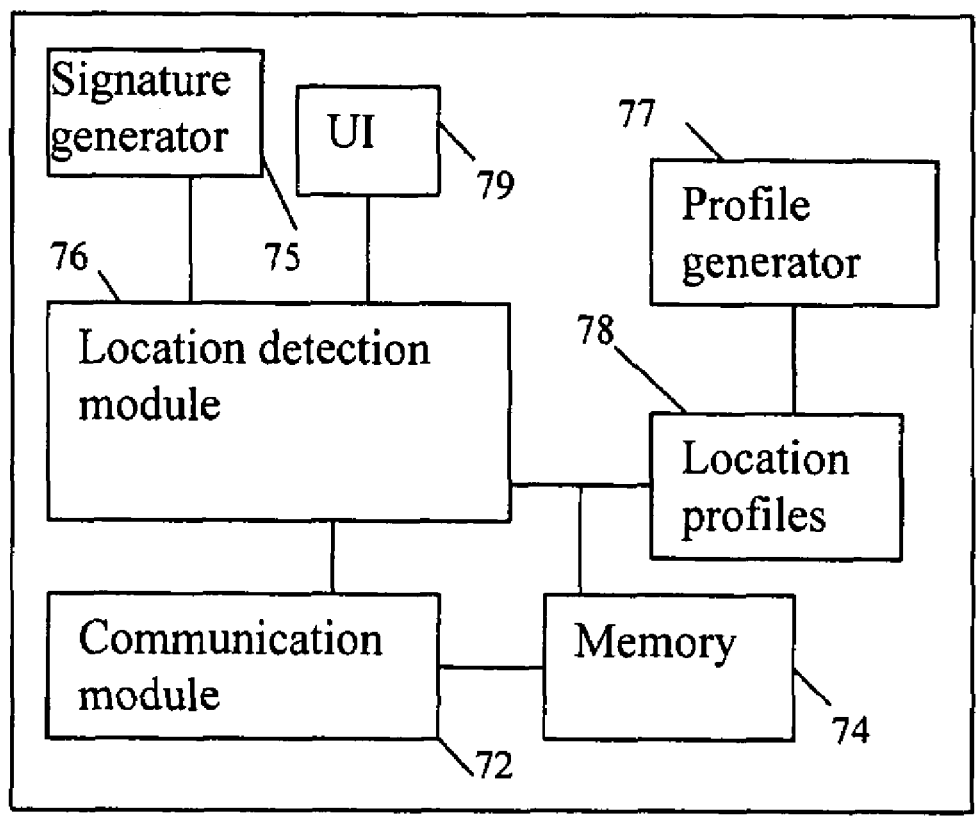
FIG. 5 shows a functional block diagram of an example client device, according to the present invention.

Referring to FIG. 5, an example client device 70 is capable of communication with other devices in a space such as through wireless links, or other links, and includes a communication module 72 for such communication. The client device also includes a storage component such as memory 74 and a location detection module 76 (e.g., a processor, firmware, an application specific circuit) that implements the steps of location detection and identification by the client device, such as described above in relation to one or more of the examples in FIGS. 1-5. The client device 70 also includes a profile generator 77 that obtains location profiles for spaces visited by the client devices, and maintains location profiles 78 for familiar spaces and familiar devices/resources. The location profiles 78 can be stored in the memory 74.

The client device can optionally include a signature generator 75 to determine the signature of a current space (similar to the space signature generator 14 in FIG. 1, or in other ways described herein). The location profiles can also be maintained external to the client device 70 for access by the client device 70. Further, the profile generator 77 can be external to the client device 70. The client device 70 may also include a user interface (UI) module 79 such as a keyboard, a display, etc.

As is known to those skilled in the art, the aforementioned example architectures described above, according to the present invention, can be implemented in many ways, such as program instructions for execution by a processor, as logic circuits, as an application specific integrated circuit, as firmware, etc.

The present invention has been described in considerable detail with reference to certain preferred versions thereof; however, other versions are possible. Therefore, the spirit and scope of the appended claims should not be limited to the description of the preferred versions contained herein.

What is claimed is:

1. A method for location identification in a space, comprising, in a client device:

maintaining one or more location profiles for one or more spaces visited by the client device, wherein the one or more spaces comprise networked digital devices which host contents and services;

detecting the presence of each networked digital device in a current space;

obtaining a space signature of the current space based on said each detected networked digital device in the current space, wherein the space signature comprises resource identifications and operations performed on resources; and performing location detection for the client device in the current space, by comparing the space signature of the current space with the space signatures stored in the location profiles, and wherein the resources comprise devices and services.

2. The method of claim 1 wherein maintaining location profiles further includes maintaining the location profiles for said visited spaces in the client device, wherein one or more spaces include a virtual space.

3. The method of claim 2 wherein performing location detection further includes comparing the space signature of the current space with the location profiles of the visited spaces for a match that indicates the location of the current space.

4. The method of claim 2 wherein performing location detection includes:

fetching the space signature of the current space;

comparing the space signature with the ones stored in the location profiles; and in case of a match, selecting the location in the matched profile as the location of the current space.

5. The method of claim 2 wherein obtaining a space signature for the current space includes:

providing an identification for resources in the current space;

discovering resources in the current space; and generating a space signature for the current space using the identifications of the set of discovered resources.

6. The method of claim 5 wherein providing an identification for every resource in the space includes providing a universally unique identifier (UUID) for every resource in the space.

7. The method of claim 6 wherein the resources include one or more of devices, content and services.

8. The method of claim 7 wherein the location profile for a space further includes associated location information of the space.

9. The method of claim 2 wherein a visited space comprises a familiar space visited by the client device more than once.

10. The method of claim 9 wherein a space familiar to a device includes a space visited by the device multiple times, wherein the number of visits is greater than a threshold.

11. The method of claim 1, wherein the space signatures further comprise protocols used for the operations.

12. The method of claim 2, wherein the space signature identifies a virtual space that is constantly changing.

13. The method of claim 2, wherein the space signature identifies a virtual space that includes shared reachable resources.

14. The method of claim 13, wherein type of resources are included in the space signature, and the type of resources vary based on a communication range of a network including the resources.

15. The method of claim 14, wherein the type of resources are used to distinguish sizes of virtual spaces for identification.

16. The method of claim 2, wherein the space signature for a virtual space is based on using one or more of WiFi, Bluetooth and cellular information.

17. A method for generating location information for a network space, comprising, in a client device:
maintaining one or more location profiles for one or more spaces with resources familiar to the client device, wherein the one or more spaces comprise networked digital devices which host contents and services;
detecting the presence of each networked digital device in a current space;
obtaining a space signature of the current space based on said each detected networked digital device in the current space, wherein the space signature comprises device and service identifications; and
performing location detection for the client device in the current space, utilizing information indicating probable presence of familiar resources in the current space, and
wherein the space signatures further comprise operations performed on the devices and services, and protocols used for the operations.

18. The method of claim 17 wherein the location profiles describe the familiar resources wherein one or more spaces include a virtual space.

19. The method of claim 18 wherein performing location detection further includes detecting the presence of familiar resources in the current space.

20. The method of claim 19 wherein performing location detection further includes checking for the presence of a full or subset of familiar resources in the current space using familiar operations and protocols described in the location profiles.

21. The method of claim 20 wherein performing location detection further includes determining the location of the current space based on the results of checking for the presence of a full or subset of familiar resources in the current space.

22. The method of claim 21 wherein determining the location of the current space based on the results of checking for the presence of a full or subset of familiar resources in the current space, further includes:
selecting a location profile describing familiar resources that are most numerous in terms of presence in the current space, for location information for the current space.

23. The method of claim 21 wherein determining the location of the current space based on the results of checking for the presence of a full or subset of familiar resources in the current space, further includes:
selecting a location profile describing familiar resources that are above a threshold in terms of presence in the current space, for location information for the current space.

24. The method of claim 18 wherein each location profile includes location information for a familiar space.

25. The method of claim 24 wherein each location profile for a space further includes information on one or more of:
familiar devices in that space;
familiar services available in that space;
special operations that can be performed within that space; and
specific communication protocols required to operate within the space.

26. The method of claim 18 wherein a space familiar to a device includes a space visited by the device.

27. The method of claim 26 wherein a space familiar to a device includes a space visited by the device multiple times, wherein the number of visits is greater than a threshold.

28. A system for location identification in a space, comprising a hardware processor coupled with:
a profile generator configured for obtaining and maintaining one or more location profiles for one or more spaces familiar to a device, wherein the one or more spaces familiar to the device further comprise networked digital devices which host contents and services;
a signature generator in the space, configured to generate a signature for a current space by detecting the presence of each networked digital device in a current space, and obtaining a signature of the current space based on said each detected networked digital device in the current space wherein the signature comprises resource identifications and operations performed on resources; and,
a location detector configured to perform location detection for the device in the current space to identify location of the current space, by comparing the signature of the current space with the signatures stored in the location profiles,
wherein the space signatures further comprise operations performed on the devices and services, and protocols used for the operations.

29. The system of claim 28 wherein the one or more spaces include a virtual space.

30. The system of claim 29 wherein the location detector is further configured to compare the signature of the current space with the location profiles of the familiar spaces for a match that indicates the location of the current space.

31. The system of claim 29 wherein the location detector is further configured to fetch the signature of the current space, compare the signature with the ones stored in the location profiles, and in case of a match, select the location in the matched profile as the location of the current space.

32. The system of claim 29 wherein the device is a mobile electronics device.

33. The system of claim 29 wherein the signature generator is further configured to discover resources in the current space and generate a signature for the current space using the identifications of the set of discovered resources.

34. The system of claim 33 wherein each resource has a UUID for every resource.

35. The system of claim 34 wherein the resources include one or more of devices, content and services.

36. The system of claim 29 wherein the location profile for a space includes the signature of the space.

37. The system of claim 36 wherein the location profile for a space further includes associated location information of the space.

38. The system of claim 29 wherein a space familiar to a device includes a space visited by the device.

39. The system of claim 38 wherein a space familiar to a device includes a space visited by the device multiple times, wherein the number of visits is greater than a threshold.

40. A device for location identification in a space, comprising a hardware processor coupled with:
a profile generator module for obtaining and maintaining one or more location profiles for one or more spaces familiar to the device, wherein the one or more spaces familiar to the device further comprise networked digital devices which host contents and services; and
a location detector module configured to perform location detection for the device in the current space to identify location of the current space, by detecting the presence of each networked digital device in a current space;

obtaining a signature of the current space based on said each detected networked digital device in the current space; and, comparing a signature of the current space with said location profiles, wherein the signature comprises resource identification and operations performed on resources, and the resources comprise devices and services.

41. The device of claim 40 wherein the profile generator module is further configured to maintain the location profiles for the familiar spaces in the device wherein one or more spaces include a virtual space.

42. The device of claim 41 wherein the location detector module is further configured to compare the signature of the current space with the location profiles of the familiar spaces for a match that indicates the location of the current space.

43. The device of claim 41 wherein the location detector module is further configured to fetch the signature of the current space, compare the signature with the ones stored in the location profiles, and in case of a match, select the location in the matched profile as the location of the current space.

44. The device of claim 41 further including a signature generator that is configured to obtain a signature for the current space.

45. The device of claim 44 wherein the signature generator is further configured to discover resources in the current space and generate a signature for the current space using the identifications of the set of discovered resources.

46. The device of claim 45 wherein each resource has a UUID for every resource.

47. The device of claim 46 wherein the resources include one or more of devices, content and services.

48. The device of claim 41 wherein the location profile for a space includes the signature of the space.

49. The device of claim 41 wherein the location profile for a space further includes associated location information of the space.

50. The device of claim 41 wherein a space familiar to the device includes a space visited by the device.

51. The device of claim 50 wherein a space familiar to the device includes a space visited by the device multiple times, wherein the number of visits is greater than a threshold.

52. The device of claim 41 wherein the location profiles include information about familiar resources in the familiar spaces.

53. A device for location identification, comprising:
a hardware processor coupled with:
a profile generator module configured for obtaining and maintaining one or more location profiles for one or more spaces with resources familiar to a client device, wherein the one or more spaces further comprise networked digital devices which host contents and services; and
a location detector module configured for performing location detection for the device in a current space to identify location of the current space by detecting the presence of each networked digital device in a current space, obtaining a signature of the current space based on said each detected networked digital device in the current space, and utilizing information in the location profiles indicating a probable presence of familiar resources in the current space, wherein the signature comprises resource identifications and operations performed on resources, wherein the resources compromise devices, services and protocols used for the operations.

54. The device of claim 53 wherein the location profiles describe the familiar resources wherein one or more spaces include a virtual space.

55. The device of claim 54 wherein the location detector module is further configured to check for the presence of familiar resources in the current space.

56. The device of claim 55 wherein the location detector module is further configured to check for the presence of a full or subset of familiar resources in the current space using familiar operations and protocols described in the location profiles.

57. The device of claim 56 wherein the location detector module is further configured to determine the location of the current space based on the results of checking for the presence of a full or subset of familiar resources in the current space.

58. The device of claim 57 wherein the location detector module is further configured to determine the location of the current space by selecting a location profile describing familiar resources that are most numerous in terms of presence in the current space, for identifying the location of the current space.

59. The device of claim 57 wherein the location detector module is further configured to determine the location of the current space by selecting a location profile describing familiar resources that are above a threshold in terms of presence in the current space, for identifying location of the current space.

60. The device of claim 54 wherein each location profile includes location information for a familiar space.

61. The device of claim 60 wherein each location profile for a space further includes information on one or more of:
familiar devices in that space;
familiar services available in that space;
special operations that can be performed within that space; and
specific communication protocols required to operate within the space.

62. The device of claim 54 wherein a space familiar to the device includes a space visited by the device.

63. The device of claim 62 wherein a space familiar to the device includes a space visited by the device multiple times, wherein the number of visits is greater than a threshold.

64. A method for location identification in a space, comprising at a client device;
maintaining one or more location profiles for one or more spaces visited by the client device;
performing location detection for the client device in a current space, by comparing a space signature of the current space with space signatures of visited spaces stored in the location profiles, wherein the space signatures comprise resource identifications and operations performed on resources; and,
counting a number of visits the client device has made to the current space, wherein the current space visited by the client device a number of times greater than a threshold is classified as a familiar space for determining whether the current space is a familiar space,
wherein the resources comprise devices, services and protocols used for the operations.

65. The method of claim 64 further comprising: learning about familiar spaces by the client device; and,
forming location profiles describing familiar resources based on the learning about familiar spaces.

* * * * *